United States Patent Office 2,971,841
Patented Feb. 14, 1961

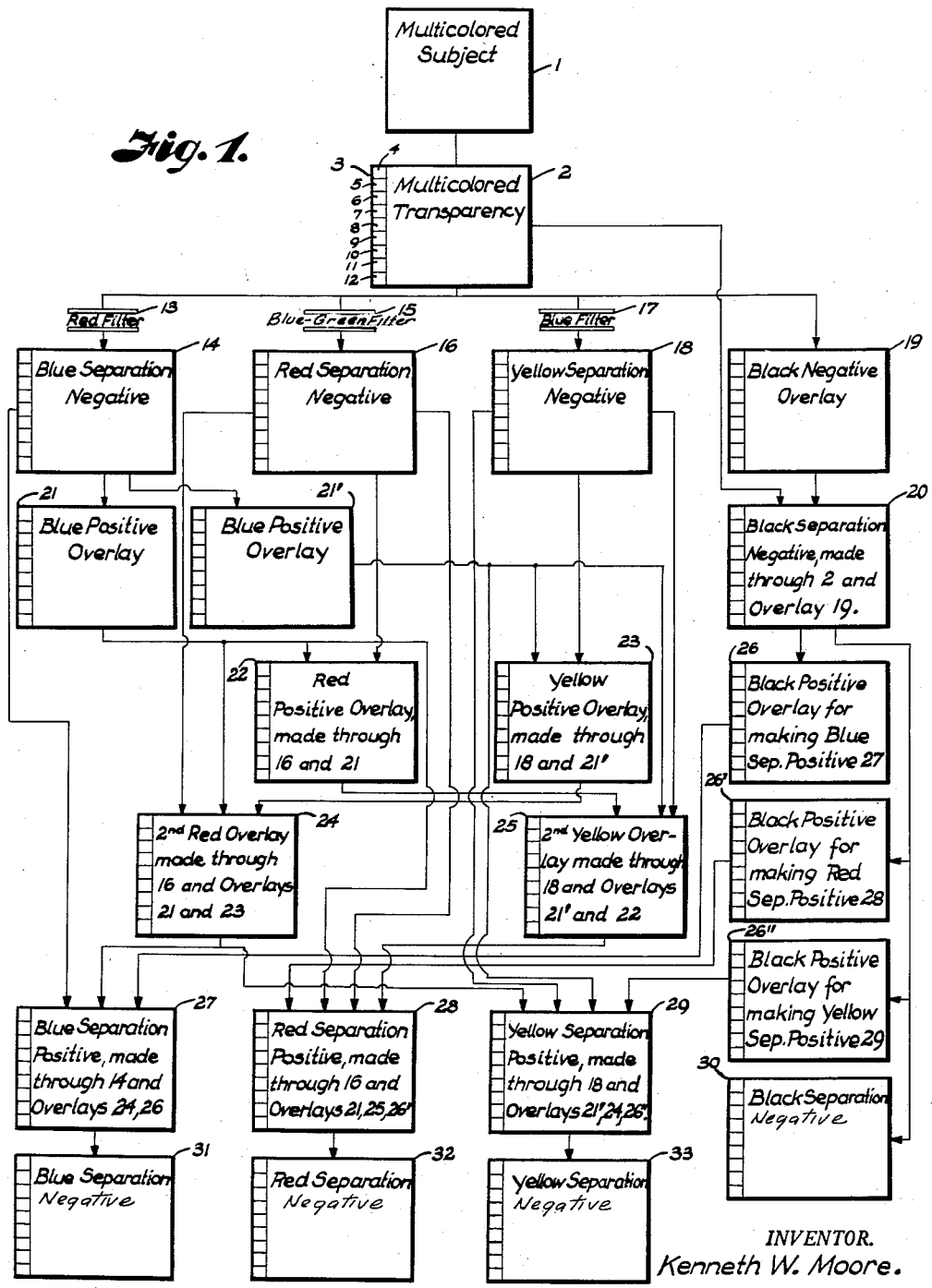

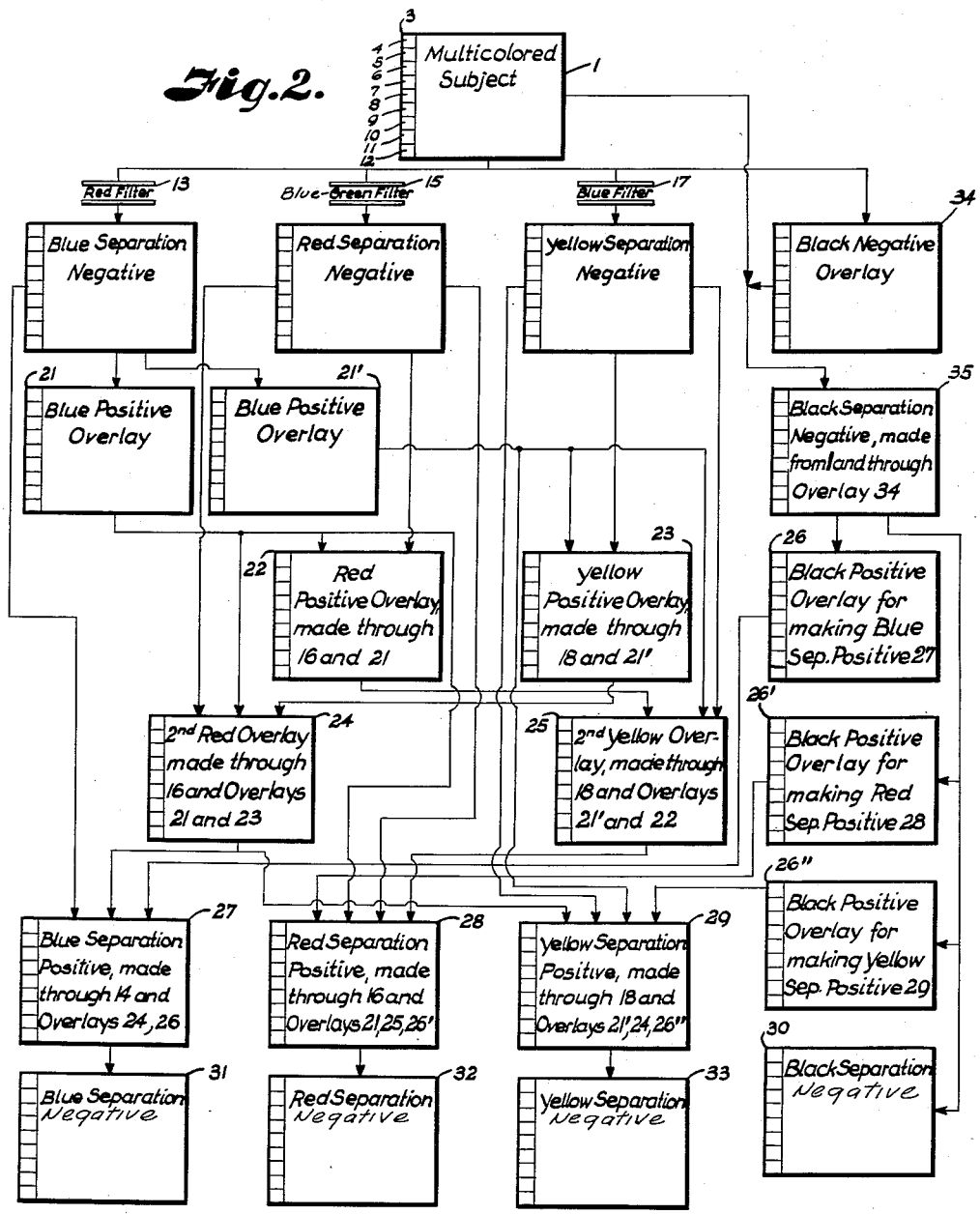

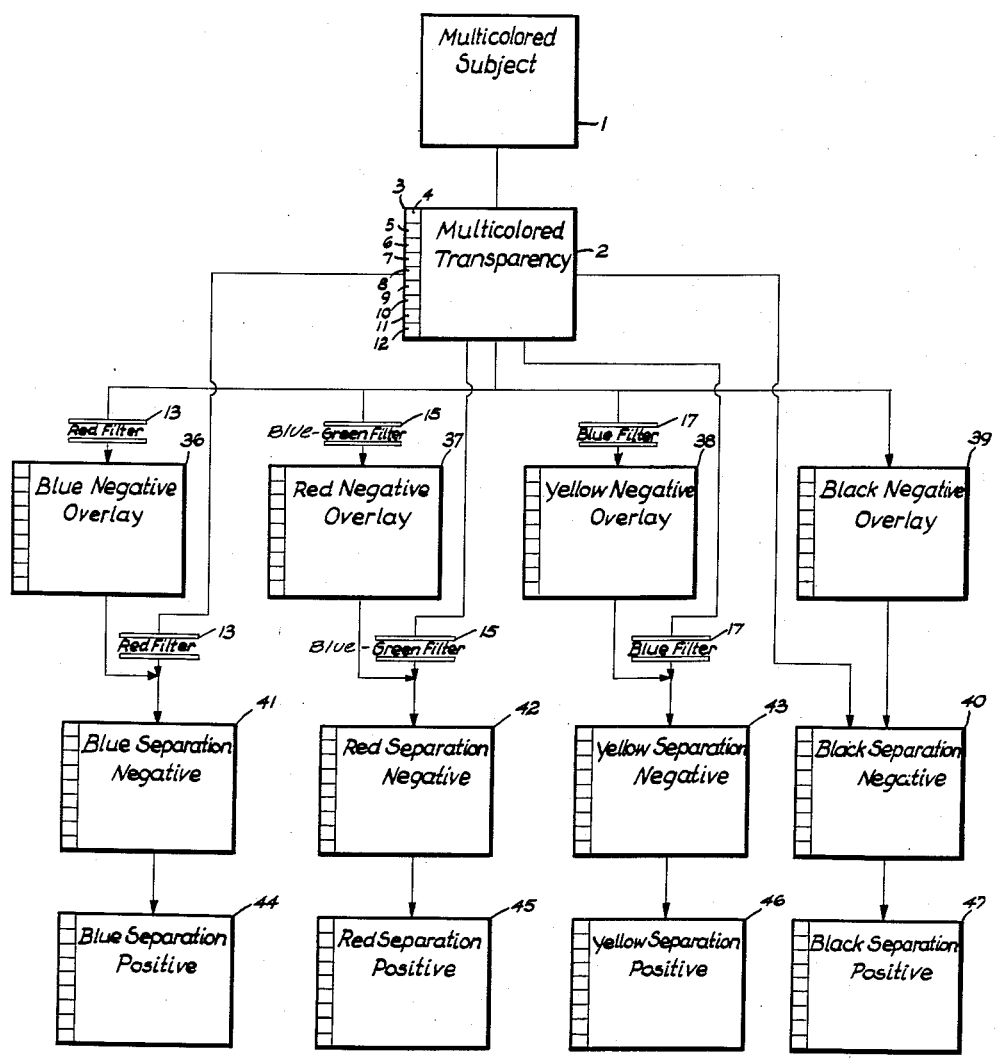

2,971,841

PROCESS FOR THE PRODUCTION OF COLOR SEPARATION NEGATIVES OR POSITIVES FOR COLOR REPRODUCTION

Kenneth W. Moore, Fairway, Kans.
(5307 Falmouth, Kansas City 3, Kans.)

Filed Feb. 20, 1956, Ser. No. 566,615

1 Claim. (Cl. 96—30)

The present invention relates to the making of color reproductions for printing by photo-mechanical processes and more particularly to a photographic process for the production of color separation negatives or positives whereby printing plates produced therefrom will accurately represent the original subject in all its colors.

The graphic arts industry has long sought a photo-mechanical process for economically producing accurate reproductions of original subjects in all their colors and have made color separation negatives through various filters and improved the separation by the employment of certain overlay transparencies but the methods heretofore used have not been able to satisfactorily remove undesired colors or interference thereby with the result that a great deal of expensive hand work is necessary in the correction or modification of the printing plates produced from the color separation negatives. One of the reasons for the difficulties is that the color pigments and process inks do not sufficiently absorb or reflect colors as they should. For example, blue ink absorbs some blue and at the same time reflects some red, with the result that its efficiency in reflection is only approximately 45 percent; the red and yellow pigments also have sufficient improper absorption and reflection to cause substantial difficulties in accurate reproduction of the original colors of the subject. It is customary in the production of color separation negatives to use a suitable gray scale or "Kodak gray scale" alongside of the original copy together with color separation guides, the gray scale being a series of densities ranging from white to black and the color separation guides being color patches of the process inks normally used, and instruments for measuring the densities or comparing same in the original copy with the gray scale and color guides to aid in determining the density range. It is common practice to utilize filters for making blue, red and yellow negatives and then using positives made from the blue negative as masks or overlays over the blue and red negatives to make corrections whereby the density range of each of the final negatives or positives is from 1.2 to 1.6 depending on the type of printing processes to be used in the making of the final reproduction. It is found, however, that the common methods do not eliminate black from primary colors of the separation negatives but merely tone it down to match the gray scale with the result that the black contaminates the primary colors in the reproduction, and that when a plate to print black is utilized the other colors are not entirely eliminated so that the black in the final reproduction reduces the tone value of the colors. In standard practice, the blue separation negative is made by placing the original copy before a camera containing a light-sensitive film or plate with a red filter between the lens and the original copy, the red filter retarding the light action of blue, green and violet and allowing the yellow, primary red and red rays to pass through. The red separation negative is made by photographing the original copy through a green filter which retards the action of the red and violet and primary red rays; however, such filters also tend to retard the action of the green and blue rays with the result that both the green and blue lacks sufficient density in the red separation negative. The yellow separation negative is usually made by photographing the original copy through a blue filter which retards the action of the yellow, primary red and green and to a certain extent the action of blue, violet and red, with the result that the yellow separation negative is not sufficiently dense in the portions representing the blues and red.

When a four-color process is to be used, a black printing plate is employed to intensify the black in the subject. The black negative has been made by exposing the film through each of the filters successively and also by the use of infra-red sensitive film or plate. While various masks and overlays have been utilized for improving the separation negatives, positives made therefrom usually do not have the full tone contrast or values of the original copy.

The objects of the present invention are to provide a photographic method of producing color separation negatives or positives for eliminating difficulties that have been experienced with the standard methods as above mentioned; to provide a process wherein the final color separation negatives are such that reproductions made therefrom have an absorption and transmission of the various light waves that are substantially balanced between the three printing colors giving better reproduction and detail and tone values of color; to provide a process which increases the density in the areas in which two or three colors are to be produced in combination in order to reproduce the correct mixed color and correct intensity thereof without altering the density in the areas requiring pure colors; to produce a black separation negative which is not contaminated by the effect of other colors in the original copy so that the black does not contaminate the other primary colors in the reproduction; to provide a process of making a mask or overlay from a color transparency and using said mask or overlay with the transparency in making a separation negative from the transparency; and to provide a novel process and sequence of steps thereof in the production of color separation negatives for accurate reproduction of original subjects in all its colors in less time and with less hand correction work on printing plates than has heretofore been accomplished.

In accomplishing these and other objects of the present invention, I have provided improved sequence of process steps, the preferred forms of which are illustrated in the accompanying drawings, wherein:

Fig. 1 is a diagrammatic view illustrating the steps in the making of color separation negatives or positives from a color transparency.

Fig. 2 is a diagrammatic view illustrating the method steps when separation negatives or positives are made from an opaque subject.

Fig. 3 is a diagrammatic view illustrating a modification of the process.

Referring more in detail to the drawings:

In practicing my process, and assuming that the original subject 1 has been photographed and reproduced in a color transparency 2; a strip 3 having nine ink patches, 4, 5, 6, and 7, 8, 9, 10, 11, 12 thereon of green, yellow, primary red, magenta, violet, cyan, white, 3-color (brown), and black process inks, respectively, to be used in the reproduction printing, the strip preferably being substantially the same paper on which the reproduction is to be printed, is suitably secured at one side of the color transparency 2. Then the color transparency 2 is placed before a camera containing a light-sensitive film or plate, and between the camera lens and the transparency 2 a red filter 13 is employed and the camera operated to expose the film which when developed will produce what is termed a blue separation negative 14. For best results, I have found that the red filter 13 actually is more of an orange such as is commercially available under the name of "Wratten #29." In like manner, the original transparency 2 is photographed through a blue-green filter 15 to expose a light-sensitive film or plate which when developed will produce what is termed a red separation negative 16. The transparency 2 is also photographed through a blue filter 17 to expose a light-sensitive film or plate which when developed will produce what is termed a yellow separation negative 18. For best results, I have found that the blue-green filter 15 is preferably what is commercially available and called "Wratten #61 and #45" together, and that the blue filter 17 is preferably "Wratten #47B." Also, it is preferred that the negatives 14, 16 and 18 be made from Panchromatic film. A light-sensitive Panchromatic film is then arranged in contact with the color transparency 2 and exposed whereby the film when developed forms a black negative overlay 19, and it has been found that in such overlay the white has a density of approximately 60 percent of the density range of the color transparency 2. The black negative overlay 19 is then placed over the color transparency 2 and in registry therewith and a light-sensitive film exposed therethrough which when developed produces a black separation negative 20. It is to be noted that no color filter is utilized in making the black separation negative 20 but the density of the color transparency 2 is determined and the exposure in making the black negative overlay 19 is such that the white in said overlay has a density of approximately 60 percent of the color transparency 2 range and the exposure time of the color transparency 2 and black negative overlay 19 together to make the black separation negative 20 is such that all of the primary colors are eliminated, leaving only black and gray of the color transparency 2 in the black separation negative 20. The density of the original copy is also considered in the making of the blue separation negative 14, red separation negative 16 and yellow separation negative 18 whereby the respective densities of said negatives are substantially the same. The red separation negative 16 usually lacks sufficient density in the yellow and blues, and it is desirable to reinforce the yellows and blues, and this is done by making a positive on a thin film from the blue separation negative 14. This blue positive is termed a blue overlay 21 and the density thereof should be approximately equal to the difference between the blue and white patches on the red separation negative 16. The blue overlay 21 is used as an overlay over the red separation negative 16, and a print is made on a thin film by exposing said film through the combination of the red separation negative 16 and blue positive overlay 21 to make a first red overlay 22 with the density thereof substantially equal to the difference between the red and white patches on the yellow separation negative 18. The yellow separation negative 18 usually does not have sufficient density in the blues and red, and in order to intensify the blues and red a blue positive overlay 21' is made from the blue separation negative 14 and used as an overlay over the yellow separation negative 18 and a thin sensitive film exposed through such combination to make a first yellow overlay 23 with the density thereof substantially equal to the difference between the blue and white on the yellow separation negative 18. The first yellow overlay 23 is used as an overlay in combination with the red separation negative 16, blue positive overlay 21 and a thin light-sensitive film exposed therethrough whereby said film when developed will be a second red overlay 24 with the density thereof substantially equal to the difference between the red and white on the yellow separation negative 18, after which the first yellow overlay 23 may be discarded. The first red overlay 22 is used as an overaly over the yellow separation negative 18 and blue positive overlay 21' and a thin light-sensitive film exposed through the combination thereof whereby said film when developed will form a second yellow overlay 25 with the density thereof substantially equal to the difference between the yellow and white on the red separation negative 16. After the second yellow overlay 25 is made, the first red overlay 22 may be discarded.

Positives are made on thin light-sensitive film from the black separation negative 20, said positives being a black mask 26 for use with the blue separation negative 14, 26' for use with the red separation negative 16, and 26" for use with the yellow separation negative 18. Then the blue separation negative 14 is combined with overlays consisting of the second red overlay 24 and black mask 26 in registry therewith and a light-sensitive film exposed through the combination which when developed forms a corrected blue separation positive 27. The red separation negative 16, blue positive overlay 21, second yellow overlay 25 and black mask 26' are combined and in registry whereby the blue positive overlay, second yellow overlay and black mask are overlays over the red separation on negative 16 and a light-sensitive film exposed therethrough which when developed forms a corrected red separation positive 28. The yellow separation negative 18 is arranged with overlays consisting of the blue positive overlay 21', second red overlay 24 and black mask 26" in registry therewith and a light-sensitive film exposed therethrough which when developed forms a corrected yellow separation positive 29. A light-sensitive film is exposed through the black separation negative 20 and developed to make a back separation positive 30. The corrected separation positives 27, 28 and 29, and black positive 30 are then photographed through suitable screens to make screen negatives from each, and the screen negatives utilized in a conventional manner for exposing of sensitive plates which are etched or processed to make suitable printing plates for printing a reproduction of the original subject in its true colors. If desired, light-sensitive film may be exposed through the blue, red and yellow separation positives 27, 28 and 29 to make a corrected blue separation negative 31, a corrected red separation negative 32 and a corrected yellow separation negative 33, and the negatives 20, 31, 32 and 33 photographed through suitable screens to make screen positives of each for use in making printing plates for reproduction of the original.

The various overlays or masks described in the above should have proper densities, and the control of the densities is important in the performance of this process in order to have good reproduction in detail and tone values of color. Also, while the overlays are used to increase or intensify certain color effects in the films, it is not necessary to increase the contrast range to allow for the masking. The overlays in the process are exposed, developed and used to mask out the unwanted colors in each separation positive or negative without disturbing the wanted colors. In the mixed colors, the overlays and sufficient density of the primary colors to give the correct shades with the process inks.

As an example only of the process, assuming the original copy or transparency 2 has a density range of the white areas to the black areas of 2.58, the exposure in producing the negatives 14, 16 and 18 should be such that the densities thereof are substantially equal between the white and the printing color, for example .82, .72 and .82 respectively. The exposure through the blue separation negative 14 to produce the blue positive overlay for use on the red separation negative should be such that the blue positive overlay 21 has a density of .26 and the exposure to produce the blue positive overlay 21' for use on the yellow separation negative should have a density of .21, said densities being with reference to the respective printing color ink patch. The exposure through the red separation negative 16 and blue positive overlay 21 should be such that the first red overlay 22 should have a density of approximately .42, and the exposure through the yellow separation negative 18 and blue positive overlay 21' should be such that the first yellow overlay 23 should have a density of approximately .36, said densities being with reference to the respective printing color ink patch. Then, the exposure through the combination of the red separation negative 16, blue positive overlay 21 and first yellow overlay 23 should be such that the second red overlay 24 should have a density of approximately .07, and exposure through the yellow separation negative 18, blue positive overlay 21' and first red overlay 22 should be such that the second yellow overlay 25 has a density of approximately .01, said densities being with reference to the respective printing color ink patch. Exposure through the blue separation negative 14, second red overlay 24 and black mask 26 which should have a density of .54 as overlays on said negative should be such that the density of the corrected blue separation positive 27 should be approximately between 1.2 to 1.6. Exposure through the red separation negative 16, blue positive overlay 21 and second yellow overlay 25 which should have a density of .37 and black mask 26' should be such that a corrected red separation positive 28 should have a density range of approximately 1.2 to 1.6. The exposure through the combination of the yellow separation negative 18, blue positive overlay 21', second red overlay 24 and black mask 26" which should have a density of .40 should be such that the corrected yellow separation positive 29 should have a density range of approximately 1.2 to 1.6 depending upon type of printing to be used. The exposure of the color transparency 2 in making the black negative overlay 19 should be such that said overlay 19 should have a density of approximately 60 percent of transmission range, and then exposure through the color transparency 2 and the overlay 19 should be such that the black separation negative 20 have a density of approximately 1.55, and the black separation positive 30 have a density of approximately 1.2–1.6. While these densities as given above are exemplary only, they show exposures whereby the absorption and transmission of the various light waves are very nearly balanced between the three printing colors, blue, red and yellow, and the exposure times can be varied to provide such a balance in accordance with the densities of the various colors on the color transparency 2 and a comparison thereof with the respective ink patches on the strip 3 and in the other negatives and positives made in performing the process, the densities of the respective negatives and positives are compared to the densities of the photographic reproduction of said ink patches on the respective negatives and positives. It is preferred that each separation negative and overlay or mask used in the process, except the final corrected separation negatives or positives, be exposed to a gamma of 1 in order to simplify the determination of density ranges and use thereof in the exposure times of the various films.

In the form of the invention diagrammatically illustrated in Fig. 2, the original multi-colored subject 1 which may be a painting or other stationary subject is photographed direct by a camera containing a light-sensitive film or plate with a red filter 13 between the camera lens and the subject 1. The film when so exposed and developed will produce the blue separation negative 14. With the same position of the camera another film or plate in the camera is exposed through the blue-green filter 15 to make the red separation negative 16 and another film in the camera exposed through a blue filter 17 to make the yellow separation negative 18. Another light-sensitive film is placed in the camera which has the same position as when exposing the films for production of the negatives 14, 16 and 18 and the camera operated to expose said other film with ordinary or white light whereby the film when developed will produce a black negative overlay 34. With the camera still in the same position, the developed black negative overlay 34 is placed in the camera and fixed therein in registry with the light rays from the multi-color subject 1 passing through the lens of the camera. Another film or plate is then placed in the camera substantially in contact with the black negative overlay 34 and the camera operated to expose said other film or plate which when developed will produce substantially the black separation negative 35. The remainder of the process to produce the corrected separation positives 27, 28, 29 and 30, or negatives 31, 32 and 33 is the same as described in the above in connection with the process diagrammatically illustrated in Fig. 1. The differences involved in the process as illustrated in Figs. 1 and 2 is that in the modified form as shown in Fig. 2, the step of making the multi-colored transparency 2 is eliminated, this being possible in the manner described when the camera and subject may be held in fixed relative position.

In the form of the invention illustrated in Fig. 3, the original subject 1 is photographed and reproduced as a color transparency 2 and the strip 3 having nine ink patches 4, 5, 6, 7, 8, 9, 10, 11 and 12 thereon of green, yellow, primary red, magenta, violet, cyan, white, 3-color (brown) and black process inks respectively, is placed at one side of the color transparency 2. The color transparency 2 is placed before a camera containing a thin light-sensitive film and the camera operated with a red filter 13 between the camera lens and the transparency 2 to expose the film which when developed will produce what is termed a blue overlay negative or mask 36, the red filter 13 preferably being such as is commercially available under the name of "Wratten #29." In like manner, the original transparency 2 is photographed through a blue-green filter 15 to expose a light-sensitive film which when developed will produce what is termed a red overlay negative 37. The transparency 2 is also photographed through the blue filter 17 to expose a light-sensitive film which when developed will produce what is termed a yellow overlay negative 38. For best results, it is preferred that the blue-green filter 15 be a combination of the filters commercially available and called "Wratten #61 and #45" and that the blue filter 17 be what is commercially available and called "Wratten #47B."

A light-sensitive film is then exposed as by contact printing with the color transparency 2 with ordinary or white light whereby the film when developed forms a black negative overlay 39, said black negative overlay 39 preferably being substantially the same as the overlay 19 produced by the process described in connection with Fig. 1. The black negative overlay 39 is then placed over the color transparency 2 and in registry therewith, and a light-sensitive film exposed therethrough which when developed produces a black separation negative 40, no color filter being utilized in making either the black negative overlay 39 or black separation negative 40.

The blue negative overlay 36 is placed in the camera and aligned whereby it is in registry with the light rays passing through the lens from the colored transparency 2 and a light-sensitive film is then placed in the camera in contact with the overlay 36 with the red filter 13 between the camera lens and the transparency, and the camera is then operated to expose the film which when developed will produce a blue separation negative 41. In the same manner, the red overlay negative 37 is placed in the camera and registered with the transparency 2 and another light-sensitive film placed in the camera in contact with the overlay 37. The camera is operated with the blue-green filter 15 thereon to expose the film which when developed will produce a red separation negative 42. In the same manner, the yellow overlay negative 38 is placed in the camera in registry with the transparency 2 and another light-sensitive film placed in the camera in contact with said overlay 38 and the camera operated to expose the film through a blue filter 17 whereby the film when developed will produce a yellow separation negative 43. If desired, blue, red, yellow and black separation positives 44, 45, 46, and 47, may be made from the respective separation negatives 41, 42, 43 and 40. It is preferred that in the practice of this process each of the films for the blue, red, yellow and black overlay negatives and blue, red, yellow and black separation negatives be developed to a gamma of 1 and that in the exposure of each of the films the density range between the white and the printing color should be determined relative to the respective ink patches or reproduction thereof whereby the overlays and filters eliminate the unwanted colors without substantially disturbing the wanted colors that are represented in the color separation negatives.

It is to be understood that while I have described processes of my invention, it is not to be limited to the exact details set forth except insofar as such limitations are included in the claim.

What I claim and desire to secure by Letters Patent is:

The process for producing color separation negatives and positives for color reproductions which comprises, photographing an original copy to make a multi-colored transparency of same, making a similar multi-colored transparency of a scale showing patches of three primary printing colors of process inks and patches of combinations of each of these primary colors combined with the other two colors and one patch of black process ink and one patch without ink showing white paper to be used in printing reproductions of the respective separation plates, placing said transparencies in side by side relation, making color separation photographic negatives of the multi-color transparencies by exposing one light-sensitive film to said multi-color transparencies with red light having substantially the transmission characteristics of the Wratten filter #29 to make a blue separation negative, exposing a second light-sensitive film to said multi-color transparencies with a blue-green light having substantially the transmission characteristics of the combination of Wratten filters #61 and #45 to make a red separation negative, exposing a third light-sensitive film to said multi-color transparencies with a blue light having substantially the transmission characteristics of the Wratten filter #47B to make a yellow separation negative, adjusting the exposure in each case to make the difference in density between the white patch and the printing color patch approximately the same, exposing a fourth light-sensitive film direct to the multi-colored transparencies using no filter and making the white patch a density of approximately one-half the density range between the white patch and the black ink patch on the multi-color transparencies to make a black negative overlay, making a blue positive overlay by exposing a light-sensitive film through said blue separation negative causing the blue ink patch to have a density approximately equal to the difference between the blue patch and white on the red separation negative, making a red positive overlay by exposing a light-sensitive film through said red separation negative and blue positive overlay in registry with the density of the red patch equal to the density difference between the red and white patches on the yellow separation negative, making a yellow overlay by exposing a light-sensitive film through the yellow separation negative and a blue positive overlay with the density of the blue ink patch approximately the density difference between the blue and white on the yellow separation negative, making a second red overlay by exposing a light-sensitive film through the red separation negative with the blue and yellow overlays in registry with the density of the red patch approximately the density difference between the red and white patches of the yellow separation negative, making a second yellow overlay by exposing a light-sensitive film through the yellow separation negative and the blue and first red overlays in registry with the yellow patch density approximately the density difference between the yellow and the white patch on the red separation negative, making a black separation negative by exposing a light-sensitive film through the multi-colored transparency and the black negative overlay in registry, making a corrected blue separation positive by exposing a light-sensitive film through the blue separation negative and said second red overlay in registry, making a corrected red separation positive by exposing a light-sensitive film through the red separation negative and blue overlay and the second yellow overlay in registry, making a corrected yellow separation positive by exposing the light-sensitive film through the yellow separation negative and the blue overlay and second red overlay in registry, and making a black separation positive from the black separation negative, each of said overlays being made to a density of the difference between the printing color and white of the unwanted colors, the exposure of each of the light-sensitive films in the steps of the process being such that said films are developed to a gamma of one.

References Cited in the file of this patent

UNITED STATES PATENTS

| | | |
|---|---|---|
| 1,349,956 | Hatt | Aug. 17, 1920 |
| 1,885,725 | Howland | Nov. 1, 1932 |
| 2,007,316 | Van Straaten | July 9, 1935 |
| 2,099,916 | Wilkinson | Nov. 23, 1937 |
| 2,177,195 | Wilkinson | Oct. 24, 1939 |

FOREIGN PATENTS

| | | |
|---|---|---|
| 360,441 | Great Britain | Nov. 3, 1931 |

OTHER REFERENCES

Tory: Photolithography, 1953 (Graphic Arts Monthly, Chicago), pp. 104–107, 110–117.

Preucil: Masking for Color Correction, The Nat'l Lithographer, N.Y., publ. 1948, 14 pages.

Preucil: The National Lithographer, vol. 57, April 1950, pp. 30–31.

Preucil: The National Lithographer, vol. 57, May 1950, pp. 34–35.

Masking Methods in Photomechanical Production, Graphic Arts Div., Kodak Limited, London, January 1952, pp. 1–3, 6–9 and 11–16.

Tory: Photolithography, 1953, Graphic Arts Monthly, Chicago, pp. 108, 119–121, 123–124.

Kodak Wratten Filters, Eastman Kodak Co., 1957, pp. 5, 30, 35, 36 and 42.